United States Patent
Grasso et al.

(10) Patent No.: US 7,386,547 B2
(45) Date of Patent: *Jun. 10, 2008

(54) RECOMMENDER SYSTEM AND METHOD

(75) Inventors: Antonietta Grasso, Grenoble (FR); Natalie S. Glance, Pittsburgh, PA (US); Jean-Luc Meunier, Saint Nazaire les Eymes (FR)

(73) Assignee: Xerox Corporation, Norwalk, CT (US)

( * ) Notice: Subject to any disclaimer, the term of this patent is extended or adjusted under 35 U.S.C. 154(b) by 537 days.

This patent is subject to a terminal disclaimer.

(21) Appl. No.: 10/877,565

(22) Filed: Jun. 24, 2004

(65) Prior Publication Data

US 2004/0254911 A1 Dec. 16, 2004

Related U.S. Application Data

(63) Continuation of application No. 09/746,917, filed on Dec. 22, 2000.

(51) Int. Cl.
*G06F 17/30* (2006.01)

(52) U.S. Cl. .......................................................... 707/6

(58) Field of Classification Search ................. 707/3–6
See application file for complete search history.

(56) References Cited

U.S. PATENT DOCUMENTS

| | | | | |
|---|---|---|---|---|
| 5,483,650 | A | 1/1996 | Pedersen et al. | 395/600 |
| 5,664,109 | A | 9/1997 | Johnson et al. | 705/2 |
| 5,694,594 | A | 12/1997 | Chang | 395/606 |
| 5,754,939 | A | 5/1998 | Herz et al. | 455/4.2 |
| 6,041,311 | A | 3/2000 | Chislenko et al. | 705/27 |
| 6,108,493 | A | 8/2000 | Miller et al. | 395/200.49 |
| 6,141,111 | A * | 10/2000 | Kato | 358/1.15 |
| 6,378,070 | B1 | 4/2002 | Chan et al. | 713/155 |
| 6,446,035 | B1 | 9/2002 | Grefenstette et al. | 704/1 |
| 6,473,203 | B1 * | 10/2002 | Hisatomi et al. | 358/403 |
| 6,562,077 | B2 | 5/2003 | Bobrow et al. | 715/517 |
| 6,578,167 | B2 | 6/2003 | Boorom et al. | 714/727 |

(Continued)

FOREIGN PATENT DOCUMENTS

EP 1 050 832 A2 11/2000

(Continued)

OTHER PUBLICATIONS

U.S. Appl. No. 09/596,070, filed Jun. 12, 2000, Natalie S. Glance.

(Continued)

*Primary Examiner*—Diane D Mizrahi
(74) *Attorney, Agent, or Firm*—Jeannette Walder

(57) ABSTRACT

A system for providing item recommendations includes a memory, a device, responsive to a user request, for recording an item on a hardcopy medium, and a processor, for storing ratings of items and for generating recommendations for new items based on recommendation criteria. In response to the user request, the processor stores an implicit rating for the requested item in the memory, determines whether, based on the implicit rating and the recommendation criteria, to generate an item recommendation, and if the criteria for generating a recommendation is met, generates a recommendation of a new item. The recommender system may further store a representation of the recorded item in the memory. Recommendations may be based on item to item similarities, item to user similarities or user to user similarities.

29 Claims, 3 Drawing Sheets

U.S. PATENT DOCUMENTS

| | | | |
|---|---|---|---|
| 6,651,218 B1 | 11/2003 | Adler et al. | 715/530 |
| 6,675,356 B1 | 1/2004 | Adler et al. | 715/530 |
| 6,785,721 B1 * | 8/2004 | Immerman et al. | 709/220 |
| 2001/0000027 A1 * | 3/2001 | Collard et al. | 399/398 |
| 2002/0053020 A1 * | 5/2002 | Teijido et al. | 713/153 |
| 2002/0080387 A1 | 6/2002 | Grasso et al. | 358/1.15 |
| 2002/0116291 A1 | 8/2002 | Grasso et al. | 705/27 |
| 2002/0126120 A1 | 9/2002 | Snowdon et al. | 345/440 |

FOREIGN PATENT DOCUMENTS

| | | |
|---|---|---|
| WO | WO 00/43915 | 7/2000 |

OTHER PUBLICATIONS

"Introducing eCabinet", Ricoh Silicon Valley, Inc., 2000, www.ricoh-usa.com.

"Understanding Internet Printing", Black Ice Software, Inc., 2000, www.blackice.com "Internet Printing Architecture", Black Ice Software, Inc., 1997, www.blackice.com.

"Ricoh eCabinet", Ricoh, 2000, www.ricoh-usa.com/prodshw/noa/ecabinet.htm.

"Ricoh eCabinet, Product Specifications", Ricoh, 2000, www.ricoh-usa.com/prodshw/noa/ecabinetb.htm.

* cited by examiner

RECOMMENDER SYSTEM AND METHOD

CROSS REFERENCE TO RELATED APPLICATIONS

This application is a continuation application of copending application Ser. No. 09/746,917 filed Dec. 22, 2000, to Grasso et al. for "Recommender System and Method." This application is related to copending, coassigned U.S. patent application Ser. No. 09/746,913, Grasso et al., "Knowledge Management System and Method," filed Dec. 22, 2000, and copending, coassigned U.S. patent application Ser. No. 09/746,914 to Snowdon et al., "Electronic Board System," filed Dec. 22, 2000.

FIELD OF THE INVENTION

This invention relates to recommender systems, and more particularly, to a recommender system associated with a hardcopy media device for generating implicit ratings.

BACKGROUND OF THE INVENTION

With the increasing use of electronic media, the demise of paper as a communication medium seemed plausible. However, the promise of the "paperless" office has not yet come to pass. It is still true, for example, that almost all important documents are printed at least once during their life, because paper is still the most convenient medium for reading, annotating and sharing documents. The combination printer/facsimile/copier room of a work group is a crossroads through which passes much of the relevant information embodied in documents.

Despite the availability of electronic information, within a workgroup employees often rely on social interaction and happenstance to discover relevant new documents and share other kinds of information. Without face-to-face interactions, a person finding a relevant document might not otherwise be aware of a colleague's interest, or might not see the link between a particular piece of information and what he or she perceives as being the colleague's set of interests.

Recommender systems, in particular collaborative recommender systems, can be part of the solution. They help augment the sharing of relevant information and allow users to declare their interests. However, until recently, workplace recommender systems have required active participation from users. For example, in Knowledge Pump (see N. Glance, D. Arregui, M. Dardenne: "Knowledge Pump: Supporting the Flow and Use of Knowledge in Networked Organizations", U. Borghoff, R. Pareschi (eds.), Information Technology for Knowledge Management, Springer Verlag, Berlin, 1998, and N. Glance, D. Arregui, M. Dardenne: "Making Recommender Systems Work for Organizations", *Proceedings of PAAM'99*, 1999), users are expected to identify documents of potential interest to others, classify them, rate them, and optionally provide comments.

The use of implicit ratings (ratings deduced from behavior) to compute recommendations has been proposed in the literature (see D. M. Nichols, "Implicit Rating and Filtering", in Proceedings of the 5$^{th}$ DELOS Workshop on Filtering and Collaborative Filtering, November 1997, Budapest, Hungary for a review of proposals). However most of these efforts have been limited to collecting user bookmarking and reading actions. Copending, coassigned U.S. patent application Ser. No. 09/596,070 filed Jun. 12, 2000, "Recommender System and Method for Generating Implicit Ratings Based on User Interactions with Handheld Devices," uses implicit ratings generated from monitoring user interaction with devices such as MP3 players or ebook readers. Copending, coassigned U.S. patent application Ser. No. 09/305,836 filed May 5, 1999, "Finding Groups of People Based on Linguistically Analyzable Content of Resources Accessed" passively captures an organization-related view of the web via conceptual indexing of the pages browsed by workers who declare themselves in "work mode."

Network office appliances are emerging in the office environment. Network office appliances are boxes that can be plugged into an office network and configured via a standard Internet interface. The services they offer via the network range from file storage to Internet access or email services. An example of a network office appliance service is the Ricoh eCabinet. The eCabinet captures documents that have been printed, faxed, scanned or emailed and builds a digital archive of these documents. The eCabinet then indexes textual information, which has been extracted via optical character recognition, and allows users to browse and search the digital archive. Given the potentially very high volume of data, the device maintains a cache on a hard-disk of the most used documents while recording less frequently used documents on a DVD storage. Handling the DVD-based backup involves some level of administration.

The eCabinet augments a basic print/scan/fax service with additional document services, e.g., document recording, searching, indexing, etc. Augmenting the print/scan/fax service is very convenient for users in that the additional services become activated by passive print/scan/fax actions, inducing very little changes in their existing work practices. However, augmenting the print/scan/fax service involves buying and installing additional dedicated eCabinet hardware and software on the local area network.

A software based solution for providing additional services to a print/scan/fax device is the Xerox Documents.com. Documents.com enables users of the system to input and output document collections, but requires uploading and downloading of files. Documents.com includes four primary services (OCR, format conversion, summarization and print and distribute).

Recommender systems which capture implicit ratings generally provide the benefit of obtaining a greater number of ratings than those systems requiring active participation. A recommender system which generates implicit ratings in a work group environment would provide even greater benefits. A system which augments print/scan/fax services without the need to acquire additional dedicated hardware or the need for users to upload and download files would provide benefits to users.

SUMMARY OF THE INVENTION

The invention gathers recommendations without the active participation of users, by deducing implicit recommendations from a work group's use of a shared recording device, such as a printer, a copier, a scanner or a set of printers, copiers or scanners, or some combination thereof. Like other workplace recommender systems, the invention offers recommendations and search mechanisms that address the problem of sharing relevant information within a work group, but at almost zero additional cost to users.

A system for providing item recommendations, according to the invention includes a memory, a device, responsive to a user request, for recording an item on a hardcopy medium, and a processor, for storing ratings of items and for generating recommendations for new items based on recommendation criteria. In response to the user request, the processor stores an implicit rating for the requested item in the memory, determines whether, based on the implicit rating and the recommendation criteria, to generate an item recommendation, and if the criteria for generating a recommendation is met, generates a recommendation of a new item. The processor and memory may be co-located with the recording device. Alternatively, the processor and memory may be located remotely from the recording device, and connected to the recording device via a local intranet or via the Internet.

The recommender system may further store a representation of the recorded item in the memory, which may be a representation of the entire recorded item, a thumbnail image of the recorded item, a set of item attributes or a characterization of the recorded item's content. The representation is used by the recommender system to measure or determine item similarities with other items or user preferences as stated in a user profile. If a user profile is stored in the system, the processor, responsive to the user request, updates the user's profile with the implicit rating. Recommendations may be based on item to item similarities, item to user similarities or user to user similarities.

User to user similarities may be determined preferably in one of two methods. In a first method, the recommender system characterizes the content of the recorded item using linguistic tools, generates a historical linguistic user profile for each user comprising a list of terms extracted from user recorded items and frequency of occurrence of such extracted terms, and generates a current linguistic user profile for each user comprising a list of terms extracted from user recorded items with terms being weighted by a damping coefficient, $e^{-\alpha t}$, where t=today−timestamp of association of the recorded item with the user and $\alpha$ is the damping coefficient. If two users have similar linguistic profiles, items recorded by one user may be recommended to the other user.

In the second method, the recommender system determines an action based user similarity rating by correlating the number of user provided items in the user's profile to the total number of recorded item representations stored in the memory. If two users have similar recording and/or rating histories, then an item or document recorded by one of them in the future is likely to interest the other person as well.

The invention extends the office printer (or a set of printers) in such a way that it becomes a recommender system. The action of recording (e.g., printing, scanning, copying) is taken to be an implicit declaration of interest. Users retain the capability to actively recommend documents to the system, if a separate input interface is provided to receive explicit rating input. The key advantages of a recommender system remain: personalized recommendations, knowledge sharing, reputation mechanisms, workgroup/community memory, and search and browsing functions, and with the advantage of a greater number of implicit ratings at no additional cost to the work group.

The recommendation system of the invention provides several functionalities. Users can automatically receive notification of documents similar to those she/he has recently or historically printed (using a document-user similarity measure). Users can automatically receive recommendations of documents printed by users with similar preferences (using a user-user similarity measure). Users can find documents similar to a given document (using document-document similarity measure). Users can find other readers of a given document (using an optional search functionality). Users can find other readers of documents similar to a given document (using a document-document similarity). Users can receive random document of the day (optionally).

Upon printing a document, users may receive one or more of these functionalities electronically via a user display or interface. Alternatively, users may receive recommendations printed on a printer cover sheet (which can be configured by an administrator to automatically display one or more notifications of the different kinds described above) as described in copending U.S. patent application Ser. No. 09/746,913, which is incorporated herein by reference.

In addition to providing recommender services to users of recording devices such as printers, facsimile machines and scanners, other services may also be provided without the need to buy and install additional software or appliance. A knowledge management system, which provides such additional services includes a device, responsive to a user request, for recording a requested item on a hardcopy medium, and a knowledge management service located on a distributed network remote from the device for providing services associated with items in the system. The service includes a repository and a processor, wherein for each item requested to be recorded, the knowledge management service stores an electronic copy of the recorded item in the repository, generates and stores a record of the user request with the requested item in the repository and associates a service with the requested item. The system also includes an input device for requesting services associated with items on the system. The input device and recording device may be the same device if the recording device is configured to enable input requests to the system.

The knowledge management system seamlessly captures the stream of recorded (e.g., printed and faxed and scanned) documents. When a physical printer, at a user location, is associated with the knowledge management system, the knowledge management services, located remotely, a virtual printer becomes associated with a physical one. The virtual printer is available to augment the service of the physical printer. The user location and knowledge management services may be connected via an intranet or via the Internet. When printing, the user has the option of selecting a physical printer not on the system or a "virtual printer" on the system. By printing on the system printer, the user enables the storage service, which keeps a print-ready version of the document, e.g., a PostScript or PDF file, in the user's personal print memory. The availability of the printed documents in the repository also creates a workgroup memory of relevant (because printed) documents on top of which it is possible to provide additional personal and collaborative services, without the requirement to have storage and processing at the user location.

Many different types of services now become available to the local user. Recorded documents may be indexed for searching and fast retrieval. Contextual memory can be used to support the search (e.g., "I remember I printed that document last week"). Related documents (the friends documents) may be retrieved along with the names of users who recorded them to support awareness of related activities and facilitate expertise location. Documents may be clustered and categorized to support self-awareness of activities and shifts in individual and group interests. Multiple versions of the same document (twin documents) may be recognized, allowing automatic versioning even when multi-authoring occurs. By extension, the system can trigger an alert to earlier readers or authors when a more recent version of a document is printed.

When the knowledge management system is connected via the Internet, a Web server that allows users to access the services from their Web browser may be used. DocuShare, for example, may be used to organize the document repository both for the storage and the access of the printed documents, and for providing the associated services.

An important feature of the knowledge management system is a recording archive, called a print memory. The system intercepts the print/scan/fax requests from local users and records the documents in a digital archive. More precisely, a local printer becomes-a virtual printer when the system creates a print queue for it in a remote system server. The users then print through the system server rather than directly toward the printer. The system thus has not only the opportunity to record the print job but also to provide additional information or service by augmenting the print job. In particular, by replacing the print banner by a FlowPort™ form created on the fly specifically for the current print job (as described in copending application Ser. No. 09/746,913) and the requesting user, the system provides highly valuable services, pertaining either to the knowledge sharing or workflow domains. A key advantage to the system resides in the non-disruptive nature of the service, as it gets fed and activated by the user's print/recording actions.

Although the knowledge management system may provide services in place, i.e., on the local network, it is additionally beneficial to provide these services via the Internet. In this case a third party may provide the storage and associated document services to the small or home office relieving them from the installation and administration costs of a dedicated appliance or software. For such an Internet based system, for example, users may register with an Internet web site of the knowledge management service provider. Users may register one or several of their own printers (facsimile machines, scanners or multi-function devices) with the service provider, specifying their network address and preferred print protocol. The Internet knowledge management web site provides the customer with the augmented recording queues corresponding to the registered devices. Users may request services through any convenient input device.

DETAILED DESCRIPTION OF THE PREFERRED EMBODIMENTS

Figure 1:
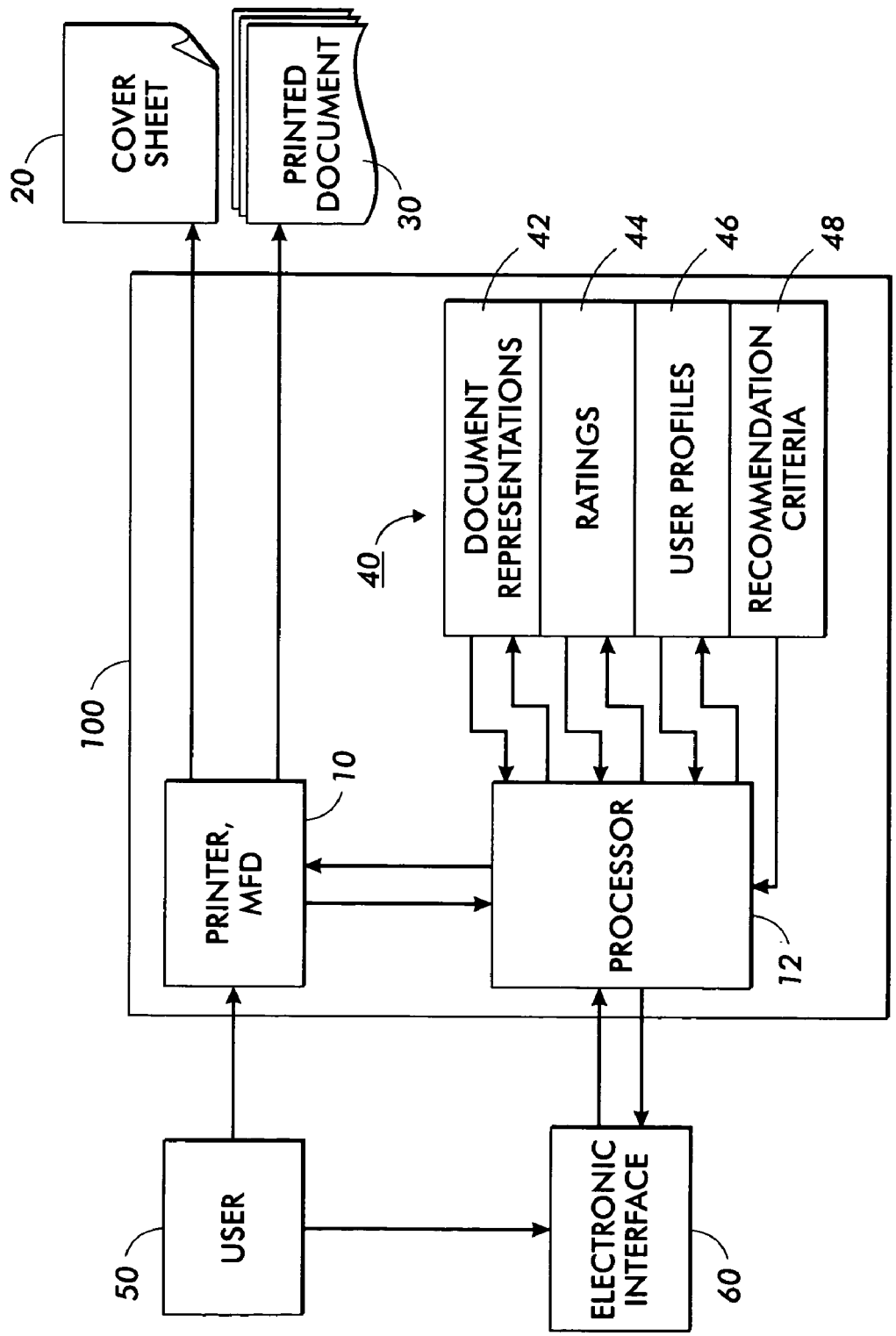
FIG. 1 is a block diagram of a system for providing recommendations according to the invention.

Referring to FIG. 1, a system for providing recommendations 100 includes a device 10 for recording a document (an item) on a hardcopy medium such as paper, a processor 12 and a memory or repository 40. Memory 40 includes regions for storing document representations 42, ratings 44, user profiles 46 and recommendation criteria 48. When a user 50 submits a request to record (e.g., print) a document to device 10, processor 12 stores an implicit rating of the requested document in ratings 44. If user 50 has a user profile stored in user profiles 46, processor 12 updates user 50's user profile to indicate an implicit rating of the requested document. Processor 12 generates a recommendation to provide to user 50 using whatever recommendation criteria has been stored in recommendation criteria 48. A recommendation may be generated based on a determination of document-document similarity (similarity of the requested document to other documents in the recommender system), a determination of document to user similarity (documents similar to those the user has printed) or a determination of user to user similarity (documents printed by other users having a similar user profile). After processor 12 arrives at a recommendation of one or more other documents to provide to user 50, these recommendations may be provided to user 50 in different ways.

As described in copending, coassigned U.S. patent application Ser. No. 09/746,913, a recommendation may be provided to user 50 by printing it on the printer output cover sheet 20 which precedes the printed document 30. Alternatively, user 50 may access electronic interface 60 and read the recommendations on a display associated with interface 60. Electronic interface 60 may be, for example, a computer, a personal digital appliance (PDA) a cell phone with internet email or a networked work station. Electronic interface may be connected to system 100 directly, wirelessly, via an intranet connection or via an Internet connection. If recommender system 100 includes optional search functionality, user 50 may access the search recommender system 100 for documents of interest based on whatever input criteria user 50 submits.

The invention, in this embodiment, can be considered as extending a printer (or some other type recording device) to a recommender system. The combination of processor and memory operates functionally to provide a module to compute and store representations of the printed documents of a work group; a module to measure similarity among printed documents; and a module to measure similarity of interest among people.

Not all users may wish to participate in the recommender system, so the work group may be set up to enable users to select printing a document in work group mode in which the user's act of printing will be input into the system as an implicit rating for the requested document. If the user elects to print in personal mode, no such rating will be stored and no recommendations will be provided. When in work group mode, the recommendation system adds an implicit positive rating of the document to the user's profile. The recommender system may be set up with many different recommendation criteria. For example, the work group may establish a recommendation criteria which requires the recommender system to extract the context from the transmitted print job and information on the user as well as on the document, either on-line or off-line. The recommendation system may also store a representation of the document in a repository (either local or remote); this representation being possibly the document itself or a set of attributes (title, references, and other metadata about the document) along with, for example, a characterization of its content computed using linguistic tools. A document similarity module may compute document similarities (again, either on-line or off-line), on the basis of the stored representation of the printed documents. An interest similarity module may correlate interests of users on the basis of how much they tend to print similar documents and computes similarities between documents and user interests (on-line or off-line).

Once the recommender system has been in place for a period of time storing ratings and generating recommendations for the work group, other typical features of recommender systems may be provided. For example, the recommender system may create a map of what has been printed in a work group. This information can then be browsed or searched from an electronic interface 60 to the system 100. In itself this collection has value as a corporate or workgroup memory. The methods implemented for indexing and browsing such a collection as described in copending, coassigned U.S. patent application Ser. No. 09/305,836 filed May 5, 1999, "Finding Groups of People Based on Linguistically Analyzable Content of Resources Accessed," are applicable here as well.

Device 10 may be a printer, copier, scanner or multi-function device (MFD). A MFD is a digital device that can scan, store the scanned item in memory and print the scanned item. When an item is presented for printing to a MFD, the MFD can store an image of the item printed. This image can be stored locally in the MFD's memory, in the recommender services memory or in a document repository. If stored in a document repository, the document repository may be located locally or remotely and accessible by a network. Storing a record or image of each item printed or recorded enables the recommender system to generate recommendations and to retain a history of items implicitly of interest to the work group. It also enables users to access the stored items. This may be especially advantageous if a transitory item such as a Web page downloaded from the Internet is printed.

The recommender system 100 can be though of as having a system architecture with three layers. A bottom layer of the system architecture consists of storage, typically implemented using a database to store document representations and user profiles. Methods for representing documents and users are discussed in more detail below. A middle layer consists of a set of services implemented via several modules that respectively are responsible for calculating and updating: (1) document-document similarity; (2) user-user similarity; and (3) document-user similarity. Finally, the top layer consists of the user interface and access to the services.

The system uses a networked printer or other recording device to collect implicit ratings on documents from users in a non-intrusive way. Access to the services is also available directly from the printer, or through standard electronic interfaces, such as via a browser, e-mail interface or document management system interface. Below are described a set of methods for calculating three different kinds of similarity measures and also describing possible implementation of user interfaces for the system.

Document representations and document-document similarity measure. Each time a document passes through the recommender system 100, the system checks to see if the document is already known to the system. First a document characteristic is computed as described below. If the characteristic matches one already stored in the system, then the document is assumed to be "known" and no further steps are taken. Otherwise, the document is assigned a document identification (docid) and the docid, characteristic and a timestamp are stored (e.g., in a database table 42 for document characteristics).

Each document contained in the system memory may be characterized using a linguistic method. Other methods of document characterization may be used. Documents can then be compared against each other to compute document-document similarities using their respective characteristics.

One method for computing document characteristics and determining document-document similarities includes the following. First, if the language used for the source text is not already known then the probable language is identified (see G. Grefenstette, "Comparing Two Language Identification Schemes", in Proceedings of The 3rd International Conference on the Statistical Analysis of Textual Data, JADT'95, December 1995, Rome, Italy). Then the text words are tokenized (see G. Grefenstette and P. Tapanainen, "What is a Word, What is a Sentence? Problems of Tokenization", in 3 rd International Conference on Computer Lexicography and Text Research, COMPLEX'94, July 1994, Budapest, Hungary). Tokenized words are then looked-up in a morphological lexicon and the most probable part of speech tag for each word is calculated (see A. Schiller, "Multilingual Part-of-Speech Tagging and Noun Phrase Mark-up", in the 15th European Conference on Grammar and Lexicon of Romance Languages", September 1996, University of Munich). This is used to produce a normalized form of each word. As this process occurs, duplicate words are discarded and a count of the number of occurrences of each word is kept to enable the calculation of weights based on word frequency. Finally, a list of stop words (see G. Salton, "The SMART Retrieval System: Experiments in automatic document processing", Prentice-Hall, 1971) for the source language is used to discard frequent words that are not used for classifying the text, such as conjunctions and prepositions.

As a result of this process each document has associated with it a list of keywords with respective frequencies. These lists of frequencies can be used to calculate the similarity between two documents using the weighted Jaccard algorithm (see G. Grefenstette, "Explorations in Automatic Thesaurus Discovery", Kluwer Academic Press, 1994). Keywords are first given weights inversely proportional to their frequency in the corpus so that less frequent words, which are better discriminators, have a higher weight.

However, this approach may not always be optimal since isolated keywords are not necessarily the best indicators of the content of a document. For example, a document containing the phrase "science fiction" would have some correlation with a document containing "computer science". In addition, available stop word lists will not contain words that have little discriminating power—for example "person". To address these concerns there are several refinements that can be made to the above approach. First, instead of using single keywords the system can identify noun phrases and use only these. To achieve better discrimination the system can be set to only use noun phrases consisting of a specified minimum number of words—for example, "information retrieval" is likely to discriminate between documents better than simply using "information" and "retrieval" as isolated keywords. Secondly, additional methods of discarding keywords can be used. Corpora like the British national Corpus provide a list of words, their part of speech, their frequency and the number of documents in the corpus that they appear in. Using this information, it is possible to determine whether a word is occurring with above average frequency in a specific text compared with how frequently it appears on average, thereby enabling only keywords of above average frequency (which are then presumably more closely related to the subject domain of the text) to be used in the similarity measure.

The similarity between two documents is then calculated as the sum of the weights of all keywords (or phrases) two documents have in common divided by the sum of the weights of all keywords associated with the two documents X and Y (Equation 1 below).

$$S_{xy} = \frac{\sum_{i}^{N_{sharedXY}} W_i}{\sum_{j}^{N_{totalXY}} W_j}$$

Equation 1

The document-document similarity measure can be used to identify: other documents similar to a given document (e.g., the one being printed by a user); and colleagues who have printed documents similar to a given document (and thus are more likely to be exploring similar topics). Two documents are defined as being similar when their document-document similarity measure exceeds a given threshold.

User profiles and user-user and user-document similarity measures. Each time a user prints/scans/copies a document, the system stores a record of the user's identification (userid), the docid, the print/scan/copy action and a timestamp. If the system also has access to "read" events for documents (via electronic monitoring of user interfaces, for example), then the system has the capability to store records of userid, docid, the read action, time spent reading and timestamp for those events. Explicit ratings and comments provided by the user through either a printer cover sheet (as described in application Ser. No. 09/746,913) paper interface or via an electronic user interface may also be stored, when available. In this way, user profiles of both implicit ratings ("print" and/or "read" actions for example) and explicit ratings (numerical scores and comments for example) may be constructed incrementally over time.

User profiles can also include term-frequency lists extracted from documents associated with the user (i.e., documents printed, read or otherwise recommended by a user). One advantageous method maintains two such term-frequency lists for each user. The first list is extracted from the set of all documents associated with a user. This list is called the user's historical linguistic user profile. For the second list, terms from documents more recently associated with the user are weighted more heavily than terms from documents whose association is further in the past. This can be achieved, for example, by multiplying document term weights by a damping coefficient, $e^{-\alpha t}$, where t=today-timestamp of association of document with the user and $\alpha$ is the damping coefficient. This second list is referred to as the user's "current" linguistic profile.

Various methods can be used to determine a user-user similarity. For example in an action-based user-user similarity, this measure of similarity calculates the correlation of users' print/rate actions over the set of documents known by the recommender system. In a linguistic user-user similarity, this measure of similarity compares the overlap in users' linguistic profiles, just as the document-document similarity measure described above computes the overlap in documents' characteristics. The overlap between a user's linguistic profile and a document characteristic may also be determined.

Action-based user-user similarity. This approach is based on the assumption that if two users have similar printing and/or rating histories then a document acted on by one of them in the future is likely to interest the other person as well. In essence, this approach is an extension of the passive collaborative filtering algorithms used by many existing recommender systems to take into account implicit ratings.

The system builds up a correlation vector for each pair of users, x and y, $\{print_{xy}, rate_{xy}\}$. For print actions (other implicit recommending actions such as reading, scanning, copying may be added as well) the correlation between two users is the relative frequency in which the two users perform the same action on the same documents, given by Equation 2:

$$print_{xy} = 3D_i/4D_i \quad \text{Equation 2}$$

That is, the print correlation for two users X and Y is the number of documents in common that both users have printed, divided by the total sum of documents printed by both users.

The rating correlation between two users can be calculated statistically, for example using the Pearson Algorithm described by P. Resnick, N. Iacovou, M. Suchak, P. Bergstrom & J. Riedl: "GroupLens: An Open Architecture for Collaborative Filtering of Netnews". In Proceeding of CSCW'94, October 22-26, Chapel Hill, N.C., 1994 and shown in Equation 3. $X_i$ and $Y_i$ represent the ratings of user X and Y respectively for item i. The algorithm yields values that range from −1 (when X and Y tend to disagree), to 0 (when X and Y's actions are uncorrelated) and to 1 (when X and Y tend to agree perfectly). Note that the only items taken into account for these computations are the ones that both X and Y have rated.

$$r_{XY} = \frac{Cov(X,Y)}{\sigma_X \sigma_Y} \text{ or} \quad \text{Equation 3}$$

$$r_{XY} = \frac{\sum_i (X_i - \overline{X})(Y_i - \overline{Y})}{\sqrt{\sum_i (X_i - \overline{X})^2} \sqrt{\sum_i (Y_i - \overline{Y})^2}},$$

where $= 1[r_{XY}[1$

The numerical correlation calculated for X and Y is then taken to be a weighted sum of the individual vectorial components. The weights assigned to the different components (i.e., print/rate) are parameters to the recommender system and may also be a function of the number of documents in common for each of the different actions. For example, the system might take into account the rating/print correlation only when the two users have rated/printed at least 10 documents in common.

Note that this approach may suffer from the cold start problem (no common action initially) and the sparsity problem (two users in general act upon different sets of documents). As a result, this approach may yield significantly useful similarity measures only after the recommender system 100 has collected a good number of user actions. However, by taking into account many different user actions the recommender system should be able to overcome the cold-start problem more rapidly than traditional rating-based recommender systems. In fact, initially, the system can be configured to convolve all user actions into one kind so as to make the most of a sparse set of actions. Thus two users who in general act upon the same documents are initially taken to be well correlated. As the system collects more actions for these two users, the more differentiated vectorial approach takes over.

Linguistic user-user and user-document similarities. In addition to computing correlations between users based on similarity of actions, it is also possible to correlate users by directly comparing their profiles to check for degree of overlap. User-user linguistic similarity is determined in the same way as document-document similarity. The only difference is that user-user similarity employs vectors that represent users' interests (either historical or current interests). These vectors are then regularly updated: either each time a document is printed (in work group mode) or periodically for all users. Similarly, the overlap in a document characteristic and a user profile can be determined to obtain the document-user similarity measure.

The recommender system offers a number of services, as discussed earlier, based on its store of document characteristics and user profiles and its calculations of user-user, document-user and document-document similarities. The work group memory thus preserved by the recommender system can be extended by combining it with a repository of documents browsed in work group mode. Services on top of a repository of browsed documents has been described in copending, coassigned U.S. patent application Ser. No. 09/305,836 filed May 5, 1999, "Finding Groups of People Based on Linguistically Analyzable Content of Resources Accessed," and implemented at Xerox Research Centre Europe the form of a research prototype called WebMemory. By combining the two repositories, improved services can be offered via the two different interfaces, paper interfaces on the one hand and electronic user interfaces on the other. Moreover, the two main services of the recommender system may be made available to Web Memory: extraction of documents similar to a template, by using the cover sheet as interface and personalized notification of documents which are likely of interest.

Browsing (i.e., reading) actions can then be added as another kind of action to the recommender system. In fact, the actions of browsing and printing a document are different degrees of declaration of quality and relevance of a document. When documents are recommended or retrieved, the user interface can indicate both the frequency of browsing and of printing in the user population.

The documents stored in the repository because of the read and print actions of the user can then be searched, to see who has similar interests and what documents are relevant to a topic. Because several people could have read and printed the same document, this information could be used to rank the value of a certain document. The two actions can be referred to as hits and be distinguished as read hit and print hit. On the basis of the linguistic representation of a document and on the basis of the number of hits associated with it, the service can provide two views on the document, in order to help the navigation of the results. The content based view orders the list of documents on the basis of their degree of similarity with the user requests, while also showing the hits and their qualitative value (read or print). The hit view orders the results by putting on top of the list the documents, which obtained higher hits measures, while still showing the strength of similarity with the user's request.

Recommendation of similar documents triggered by a printed document. Each time a document is printed, the document itself can be used as a template against which to measure for similarity in the repository. The content of the printed document may be converted to a linguistic representation that is then used to measure for similarity in the way described above. The list of results is then presented in one of the two views (content or hit) explained above. The result can be delivered to the user on the print cover sheet of the document. The cover sheet itself can be an active token supporting subsequent retrieval of the suggested documents directly from the printer as described in application Ser. No. 09/746,913.

Recommendation of documents of interest on the basis of similarity of interest. The print memory could also advise purely on the basis of the user-user similarities, without relying on a sample document, like in the previous case. The previous mode could be defined as reactive and the mode presented here, proactive. While for the reactive mode a convenient output could be the cover sheet of the printed document taken as template, in the case of the proactive set of recommendation probably other means would be more appropriate. For example, users could receive by e-mail a compiled list of documents which the group (at the chosen organizational granularity degree of preference) considers of interest (either historically or recently).

Figure 2:
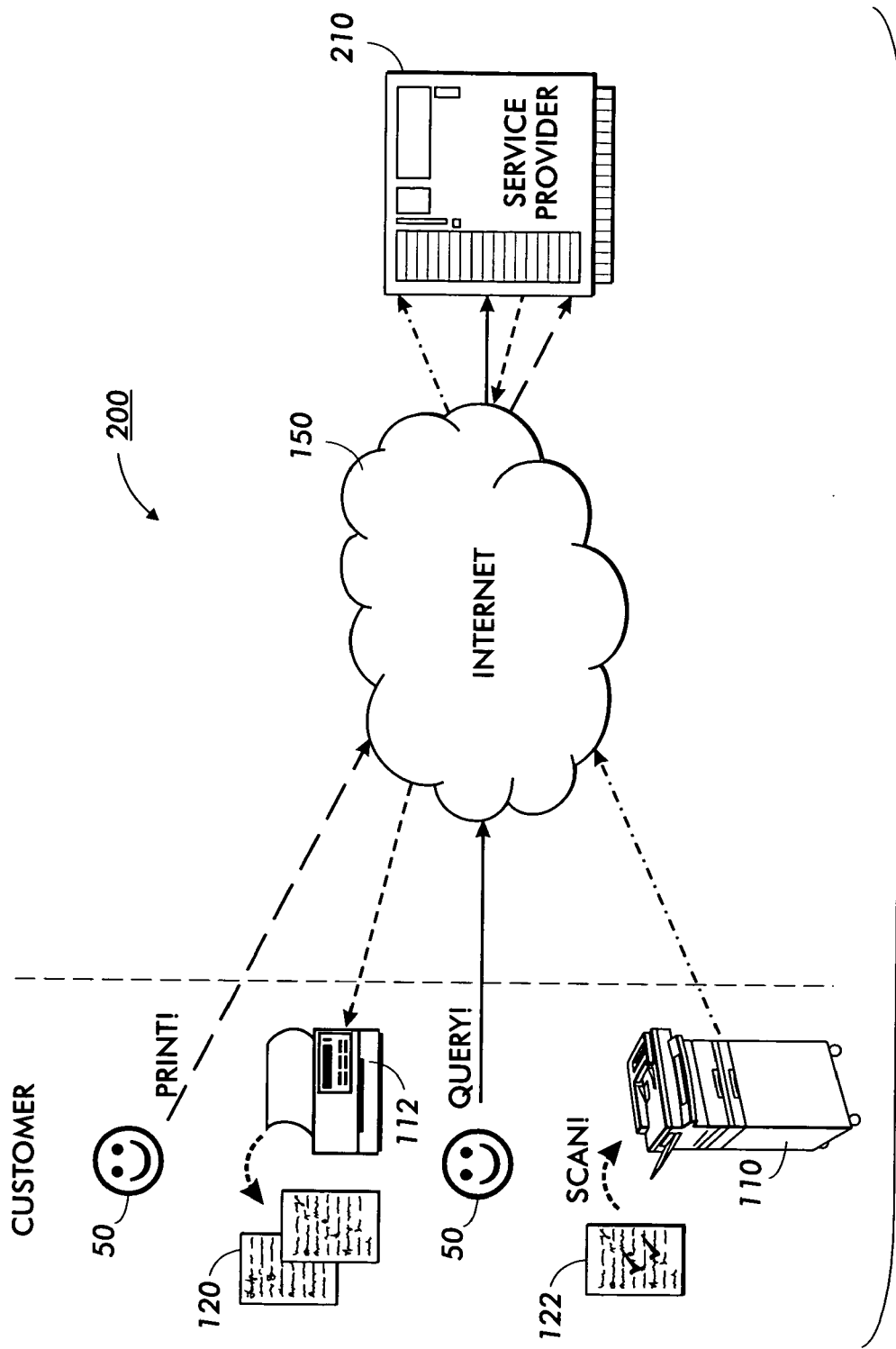
FIGS. 2 and 3 are block diagrams of a distributed knowledge management system according to the invention.
Figure 3:
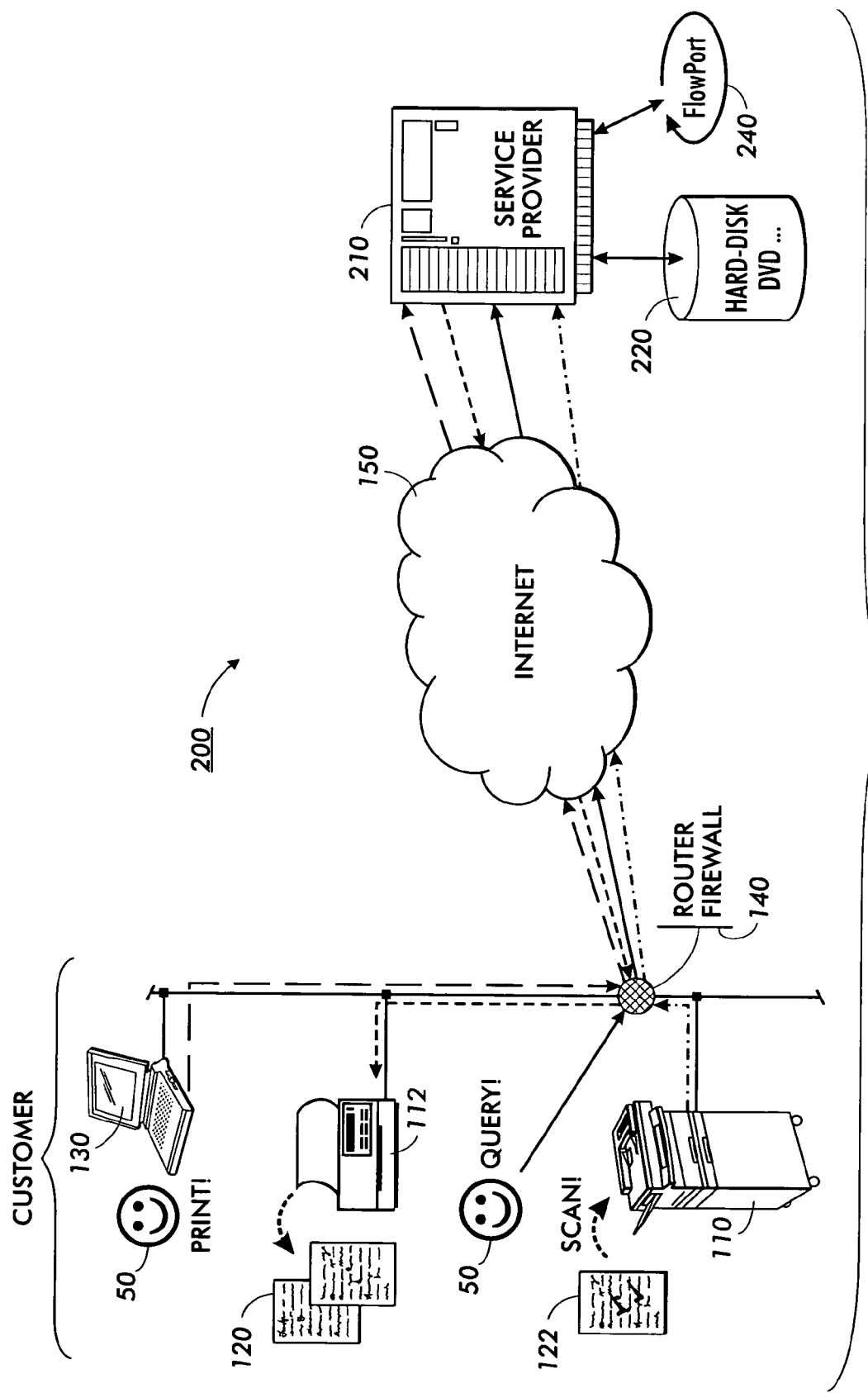

In another embodiment of the invention, in addition to capturing to providing recommender services to users of recording devices, other document related services may also be provided. Referring to FIGS. 2 and 3, a distributed knowledge management system 200 is shown. System 200 includes knowledge management service provider 210, which is located remotely from users 50. In this example, users 50 access the services provided by service provider 210 via the Internet 150. Service provider 210 includes a repository and a processor. Various types of services may be provided by provider 210 (including the recommender services described above).

To access the services, user 50 prints a document 120 through a local printer 112, which is connected to service provider 210. The service provider 210 records the document 120 in the digital archive it hosts for the user 50. It also process the print job in order to provide the various document services. This processing may include storing a copy of the printed document 120, extracting text, content indexing and other services. Service provider 210 then transmits the print job to the user's printer 112 where the printed document is produced. Service provider 210 may be augmented with additional storage 220 and data management tools such as FlowPort 240.

The user 50 picks up the print job from his own printer 112. The user 50 can access browse, search and any other service via the web site 130 of the service provider 210. The customer can also access to services via a paper-based user interface 110 (such as FlowPort forms) by scanning the filled-in form 122 on a FlowPort enabled MFD 110. As described in copending application Ser. No. 09/746,913, the printed document may be preceded by a special banner page which may be a FlowPort form allowing the user to conduct further interactions with the service provider on paper. Because the cover sheet 122 is uniquely identified, it constitutes a pointer to the stored document in the digital archive.

Distributed system 200 offers knowledge management services to users as well as other advantages. System 200 cuts the acquisition cost of a dedicated device or software. Administration costs, in particular those induced by a safe archiving of large volume of data, are cut; archiving is now on a remote repository. The customer benefits from an up-to-date service. Geographically spread offices can share a single archive seamlessly. Several different purposes may be accomplished at the same time with system 200. Several offices under same ownership may share the same archive; several offices under different respective ownerships may share an archive for collaboration purposes.

System 200 requires that users give the service provider network access to their printer. This may potentially require the configuration of a firewall 140, and raises security consideration with respect to a potential improper use of the printer by malicious persons. This can be solved by setting up access control for the usage of the printer, which is well known to those skilled in the art of network connectivity. Additionally, security issues may be considered. The client and server authentication (proving that the user is who he/she claims to be), data integrity (ensuring content remains unaltered) and privacy (keeping content private) can be properly handled over the Internet using a secure transport protocol such as Secure HTTP, or to the Internet Print Protocol. However, the service provider has full access to the content. Privacy and content integrity can technologically not be guaranteed and the customer must trust the service provider (as it does with banks, public notary and so on). While print jobs are often of large size and the Internet bandwidth sometimes constitutes a bottleneck; however, these issues are believed to be minor because of ongoing bandwidth improvements.

Examples of services that can be provided by system 200 (by capturing the document recording stream) include the following. Textual content can be extracted from captured documents and indexed. The current OCR technology is close to a character cognition rate of 100% for machine-generated characters. PostScript-to-text converters are an alternative, which is less efficient. A permanent archival of printed documents, with associated search and visualization services may be created. This archive supports the contextual memory, e.g., "I remember I printed this document few weeks ago on that color printer." Automatic clustering and categorizing of documents provide a hierarchical view of the stored documents.

From a network perspective, it is assumed that the user has a local area network that is linked to the Internet by a router, in order to allow the service provider 210 to transmit a print job to the user's printer. This configuration implies also the usage of a firewall 140. While very frequent for offices, even small ones, this configuration is less common in home offices, but home office networks may be more popular in the future. To minimize the time delay caused by sending the print document to service provider 210 which processes the document before the document is released, an alternative approach is to send a copy of the print job to the service provider (a carbon copy to the service provider rather than a print through it). This can be accomplished by modifying the print spooler. In this embodiment, the service provider can extract the data needed from the document while the local printer is generating the print job. However, in this alternative embodiment, the service provider may not be able to provide information via the print cover sheet. This embodiment eliminates the need for granting printer access to the service provider, reduces by a factor of two the size of data transmitted over the Internet and does not slow down the print time.

The service provider may provide an XML interface through which document content and user requests can be passed between the user interface and the server. Using an XML interface offers several advantages in that a number of user interfaces are available. Users can access the service through a paper interface. If a FlowPort form is produced every time a document is printed, the user can take the FlowPort form to the input device to request services. This interface supports hand-written note taking, classification of the document and sharing of the document by means of the document token. Users can access the service provider via a DocuShare account. DocuShare offers an equivalent of a Web interface. Users can access the service provider via a wireless connections such as through a personal digital assistant (PDA). Services (browse and reprint) are available from the PalmPort interface. PalmPort supports infrared based browsing and printing on a multifunctional device. User can access the service provider through a Digital Filing Cabinet (DFC). DFC is a user interface developed in Cambridge, U.K. to access high-level document functions from a multifunctional device (MFD). System services are available from the DFC interface to demonstrate a different way to retrieve documents from the MFD (i.e., exploiting the contextual memory associated to the print action).

The knowledge management system seamlessly captures (workgroup and organizational) recording actions to take benefit from the common repository that is created in through these actions. One benefit of the system is that it can provide a means of retrieving information via clustering and categorization. After a recorded document is stored and analyzed, a similarity metric is available, based on term weighting on the base of average frequency on the Web. This metric provides an infrastructure for building a number of services: detection of ancestors (versions), children (portions) and friend (related) documents; detection of clusters of interests, both to support activity analysis and to support information exploration activities; community mining, discriminating between communities of practice (with a high degree of print overlap) and communities of interest (with a high degree of topic overlap).

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A system for providing item recommendations in a knowledge management environment, comprising:
   a memory;
   a device, responsive to a user request, for recording an item on a hardcopy medium;
   a processor, for storing ratings of items and for generating recommendations for new items based on recommendation criteria;
   wherein an implicit rating comprises the user's request for recording the item on a hardcopy medium;
   wherein, responsive to the user request, the processor stores an implicit rating for the requested item in the memory, determines whether, based on the implicit rating and the recommendation criteria, to generate an item recommendation, and responsive to meeting the criteria for generating a recommendation, generates a recommendation of a new item; and
   a knowledge management service located on a distributed network remote from the device for providing services associated with items in the system comprising: a repository and a processor, wherein for each item requested to be recorded, the knowledge management service stores an electronic copy of the recorded item in the repository, generates and stores a record of the user request with the requested item in the repository and associates a service with the requested item.

2. The system of claim 1, wherein the processor further stores a representation of the recorded item in the memory.

3. The system of claim 2, wherein the representation is selected from the group consisting of a representation of the entire recorded item, a thumbnail image of the recorded item, a set of item attributes and a characterization of the recorded item's content.

4. The system of claim 1, wherein the memory stores user profiles for users of the system, wherein each user profile includes a set of user preferences pertaining to items and wherein the processor, responsive to the user request, updates the user's profile with the implicit rating.

5. The system of claim 4, wherein the processor further stores a representation of the recorded item in memory and determines an item similarity for the recorded item.

6. The system of claim 5, wherein the item similarity comprises an item to item similarity is determined by comparing the stored representation of the recorded item with the stored representations of other recorded items stored in the memory.

7. The system of claim 5, wherein the item similarity comprises an item to user similarity which is determined by comparing the stored representations of the user's recorded items with the stored representations of other recorded items stored in the memory.

8. The system of claim 4, wherein the processor determines a user to user similarity for the user by comparing the user's profile with the other user profiles stored in the memory.

9. The system of claim 4, wherein the processor updates the user's profile by determining how often the user records items having a similar item similarity and further stores the updated user profile in the memory.

10. The system of claim 4, wherein the processor, responsive to the user's request, stores a record of a user ID, a record of an item ID and a time stamp.

11. The system of claim 4, wherein the processor determines an action based user similarity by correlating the number of user implicit ratings in the user's profile to the total number of recorded item implicit ratings stored in the memory.

12. The system of claim 1, wherein the device is selected from the group consisting of a printer, a copier, a scanner and a multi-function device for printing, scanning and copying.

13. A method for generating recommendations, comprising:
    providing a user request for recording an item on a hardcopy medium;
    storing an implicit rating of the requested item, wherein an implicit rating comprises the user's request for recording the item on a hardcopy medium;
    determining whether, based on the implicit rating and recommendation criteria, to generate an item recommendation;
    responsive to meeting the criteria for generating a recommendation, generating a recommendation of a new item; and
    in a knowledge management service located on a distributed network remote from the device for providing services associated with items in the system comprising: a repository and a processor, wherein for each item requested to be recorded, storing an electronic copy of the recorded item in the repository, generating and storing a record of the user request with the requested item in the repository and associating a service with the requested item.

14. The method of claim 13, wherein the recording is selected from the functions of printing, scanning and copying.

15. The method of claim 13, further comprising storing user profiles for users providing user requests, wherein each user profile includes a set of user preferences pertaining to items and further comprising, updating the requesting user's profile with the implicit rating.

16. The method of claim 15, further comprising storing a representation of the recorded item in memory and determining an item similarity for the recorded item.

17. The method of claim 15, further comprising storing a representation of the recorded item in memory and comparing the stored representation of the recorded item with stored representations of other recorded items.

18. The method of claim 15, further comprising storing a representation of the recorded item in memory and comparing the stored representations of the user's recorded items with the stored representations of other recorded items.

19. The method of claim 15, further comprising updating the user profile for each item provided by the user.

20. The method of claim 15, further comprising:
    determining an action based user similarity rating by correlating the number of user provided items in the user's profile to the total number of recorded item representations stored in the memory.

21. The method of claim 13, further comprising storing a representation of the recorded item in a memory.

22. The method of claim 21, wherein the representation is selected from the group consisting of a representation of the entire recorded item, a thumbnail image of the recorded item, a set of item attributes and a characterization of the recorded item's content.

23. The system of claim 13, further comprising determining a user to user similarity for the user by comparing the user's profile with the other stored user profiles.

24. A knowledge management system, comprising:
    a device, responsive to a user request, for recording a requested item on a hardcopy medium;
    a knowledge management service located on a distributed network remote from the device for providing services associated with items in the system comprising: a repository and a processor, wherein for each item requested to be recorded, the knowledge management service stores an electronic copy of the recorded item in the repository, generates and stores a record of the user request with the requested item in the repository and associates a service with the requested item;
    an input device for requesting services associated with items on the system;
    wherein the knowledge management service comprises a recommender service for storing ratings of items and for generating recommendations for new items based on recommendation criteria; and
    wherein, responsive to the user request, the recommendation service stores an implicit rating for the requested item, determines whether, based on the implicit rating and the recommendation criteria, to generate an item recommendation, and responsive to meeting the criteria for generating a recommendation, generates a recommendation of a new item.

25. The knowledge management system of claim 24, wherein the device comprises a printer and the device and the input device are connected to the knowledge management service via the Internet.

26. The knowledge management system of claim 24, wherein the services associated with items comprise content extraction and indexing.

27. The knowledge management system of claim 24, wherein the services comprise recommendations.

28. The knowledge management system of claim 24, wherein the device comprises a multi-function device for printing, scanning and copying items.

29. The knowledge management system of claim 24, wherein the recommender service further stores user profiles for use in generating recommendations.

* * * * *